(12) United States Patent
Arioka et al.

(10) Patent No.: US 10,247,622 B2
(45) Date of Patent: Apr. 2, 2019

(54) TEMPERATURE MEASUREMENT DEVICE AND TEMPERATURE MEASUREMENT METHOD

(71) Applicant: FUJITSU LIMITED, Kawasaki-shi, Kanagawa (JP)

(72) Inventors: Takahiro Arioka, Isehara (JP); Kazushi Uno, Atsugi (JP); Takeo Kasajima, Machida (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 15/271,963

(22) Filed: Sep. 21, 2016

(65) Prior Publication Data
US 2017/0097267 A1    Apr. 6, 2017

(30) Foreign Application Priority Data
Oct. 5, 2015  (JP) .................................. 2015-197557

(51) Int. Cl.
*G01K 11/32*   (2006.01)

(52) U.S. Cl.
CPC ........ *G01K 11/32* (2013.01); *G01K 2011/322* (2013.01); *G01K 2011/324* (2013.01)

(58) Field of Classification Search
CPC ............. G01K 11/32; G01K 2011/322; G01K 2011/324
See application file for complete search history.

(56) References Cited

U.S. PATENT DOCUMENTS

| | | | | |
|---|---|---|---|---|
| 4,673,299 A | * | 6/1987 | Dakin .................... | G01K 11/32 250/458.1 |
| 4,823,166 A | * | 4/1989 | Hartog .................. | G01D 5/268 250/227.19 |
| 5,054,935 A | * | 10/1991 | Tanabe .................. | G01K 11/32 250/227.14 |
| 5,449,233 A | * | 9/1995 | Sai ........................ | G01K 11/32 250/227.14 |

(Continued)

FOREIGN PATENT DOCUMENTS

| | | | | |
|---|---|---|---|---|
| CA | 2955237 | * | 1/2016 | ............ G01K 11/32 |
| JP | 7-218354 | | 8/1995 | |
| JP | 2014-167399 | | 9/2014 | |

OTHER PUBLICATIONS

Computer translation of JP2014-167399 from the JPO website. Aug. 24, 2018.*

*Primary Examiner* — Randy W Gibson
(74) *Attorney, Agent, or Firm* — Fujitsu Patent Center

(57) ABSTRACT

A temperature measurement device includes: an optical fiber that is arranged along a predetermined path; a light source configured to input a light into the optical fiber; a measurer configured to measure temperature distribution information in an extension direction of the optical fiber based on a back-scattering light from the optical fiber; and a corrector configured to make a filter for reducing a noise component of temperature distribution information measured by the measurer based on a difference of temperature distribution information between two different regions of the optical fiber in which a common temperature distribution is obtained, and correct the temperature distribution information by applying the filter to the temperature distribution information.

15 Claims, 14 Drawing Sheets

(56) References Cited

U.S. PATENT DOCUMENTS

| | | | | |
|---|---|---|---|---|
| 5,765,948 A * | 6/1998 | Sai | ............... | G01K 11/32 |
| | | | | 250/227.14 |
| 2013/0018633 A1* | 1/2013 | Amiri Farahani | ..... | G01M 11/39 |
| | | | | 702/189 |
| 2013/0100984 A1* | 4/2013 | Agawa | ............... | G01K 11/32 |
| | | | | 374/161 |
| 2014/0233600 A1* | 8/2014 | Lee | ............... | G01K 15/005 |
| | | | | 374/1 |
| 2014/0241396 A1* | 8/2014 | Shida | ............... | G01K 11/32 |
| | | | | 374/161 |
| 2014/0254629 A1* | 9/2014 | Shida | ............... | G01K 11/32 |
| | | | | 374/161 |
| 2014/0268110 A1* | 9/2014 | Hartog | ............... | G01D 5/35364 |
| | | | | 356/73.1 |
| 2015/0330844 A1* | 11/2015 | Oishi | ............... | G01M 11/3109 |
| | | | | 356/73.1 |
| 2016/0018271 A1* | 1/2016 | Shida | ............... | G01K 11/32 |
| | | | | 374/161 |
| 2016/0238461 A1* | 8/2016 | Arioka | ............... | G01K 11/32 |
| 2017/0254708 A1* | 9/2017 | Koizumi | ............... | G01D 5/28 |
| 2018/0058947 A1* | 3/2018 | Uno | ............... | G01K 11/32 |
| 2018/0058948 A1* | 3/2018 | Uno | ............... | G01K 11/32 |
| 2018/0094987 A1* | 4/2018 | Iwamura | ............... | G01K 11/32 |
| 2018/0143085 A1* | 5/2018 | Uno | ............... | G01K 11/32 |

* cited by examiner

FIG. 11

| STANDARD DEVIATION σ | BEFORE FILTERING | AFTER FILTERING | REDUCTION [%] |
|---|---|---|---|
| AROUND 500m | 3.43 | 2.70 | 21.1 |
| AROUND 1000m | 2.61 | 1.93 | 26.1 |
| AROUND 2000m | 1.40 | 1.03 | 26.5 |
| AROUND 3000m | 1.15 | 0.85 | 26.5 |

SPECIFIC REGION

SPECIFIC REGION

TEMPERATURE MEASUREMENT DEVICE AND TEMPERATURE MEASUREMENT METHOD

CROSS-REFERENCE TO RELATED APPLICATION

This application is based upon and claims the benefit of priority of the prior Japanese Patent Application No. 2015-197557, filed on Oct. 5, 2015, the entire contents of which are incorporated herein by reference.

FIELD

A certain aspect of embodiments described herein relates to a temperature measurement device, a temperature measurement method and a computer-readable non-transitory medium.

BACKGROUND

A technology, in which a temperature distribution in an extension direction of an optical fiber is measured with use of a back-scattering light from the optical fiber when entering a light into the optical fiber from a light source, is being developed (for example, see Japanese Patent Application Publications Nos. 7-218354 and 2014-167399)

SUMMARY

According to an aspect of the present invention, there is provided a temperature measurement device including: an optical fiber that is arranged along a predetermined path; a light source configured to input a light into the optical fiber; a measurer configured to measure temperature distribution information in an extension direction of the optical fiber based on a back-scattering light from the optical fiber; and a corrector configured to make a filter for reducing a noise component of temperature distribution information measured by the measurer based on a difference of temperature distribution information between two different regions of the optical fiber in which a common temperature distribution is obtained, and correct the temperature distribution information by applying the filter to the temperature distribution information.

According to another aspect of the present invention, there is provided a temperature measurement device including: an optical fiber that is arranged along a predetermined path; a light source configured to input a light into the optical fiber; a measurer configured to measure temperature distribution information in an extension direction of the optical fiber based on a back-scattering light from the optical fiber; and a corrector configured to make a filter for reducing a noise component of temperature distribution information measured by the measurer based on a difference between temperature distribution information obtained in a case where the light source inputs a light into a first end of the optical fiber and temperature distribution information obtained in a case where the light source inputs a light into a second end of the optical fiber in a specific region of the optical fiber, and correct the temperature distribution information by applying the filter to the temperature distribution information.

BRIEF DESCRIPTION OF DRAWINGS

FIG. 11 illustrates a standard deviation before a filtering and after a filtering of each position of an optical fiber;

DESCRIPTION OF EMBODIMENTS

Embodiment

Figure 1A:
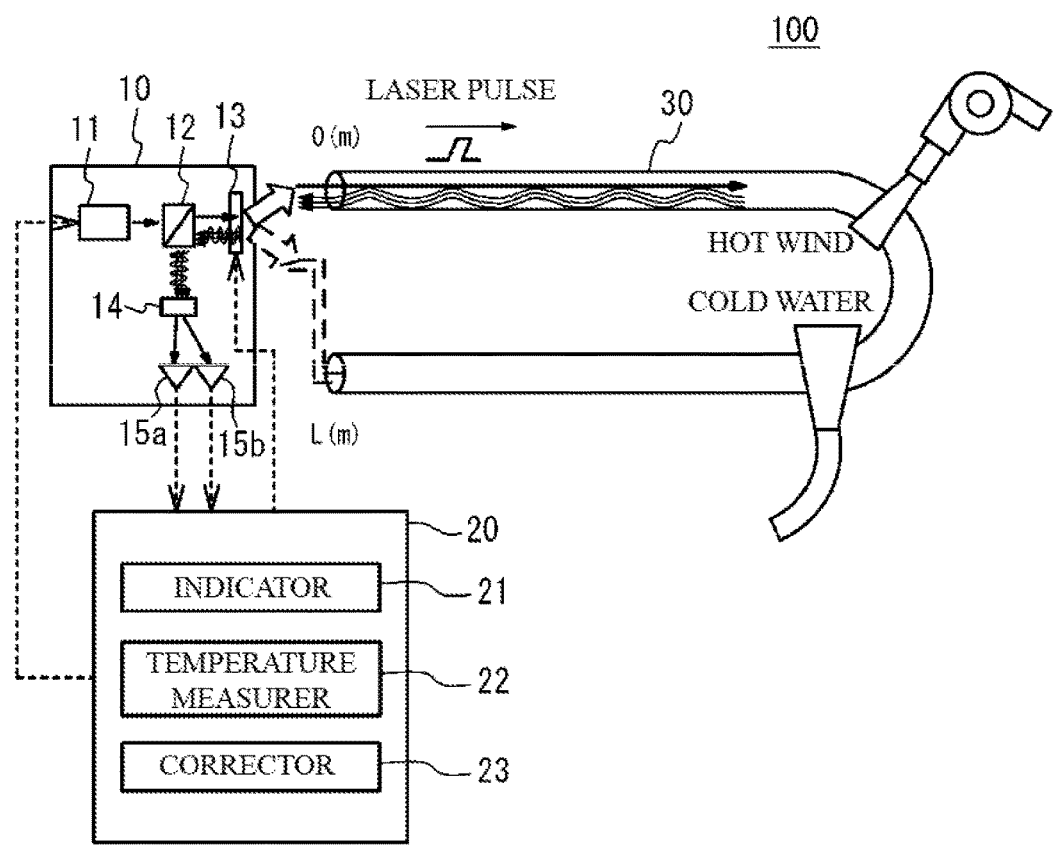
FIG. 1A schematically illustrates an overall structure of a temperature measurement device in accordance with an embodiment.

FIG. 1A schematically illustrates an overall structure of a temperature measurement device 100 in accordance with an embodiment. As illustrated in FIG. 1A, the temperature measurement device 100 has a measurement device 10, a controller 20, an optical fiber 30 and so on. The measurement device 10 has a laser 11, a beam splitter 12, an optical switch 13, a filter 14, a plurality of detectors 15a and 15b, and so on. The controller 20 has an indicator 21, a temperature measurer 22, a corrector 23 and so on.

Figure 1B:
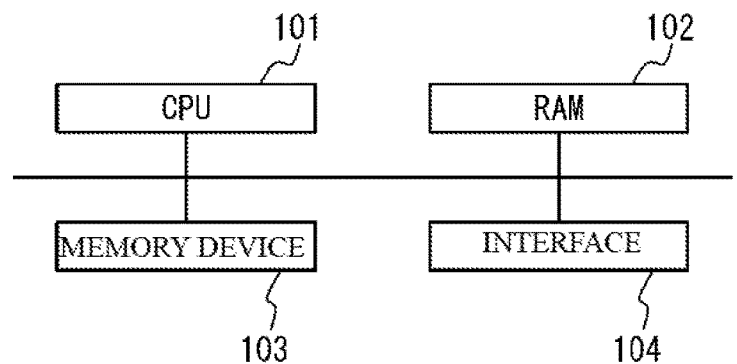
FIG. 1B illustrates a block diagram of a hardware structure of a controller.

FIG. 1B illustrates a block diagram of a hardware structure of the controller 20. As illustrated in FIG. 1B, the controller 20 has a CPU 101, a RAM 102, a memory device 103, an interface 104 and so on. The components are connected by a bus or the line. The CPU 101 is a central processing unit. The CPU 101 has one or more cores. The RAM (Random Access Memory) 102 is a volatile memory that temporarily stores a program executed by the CPU 101, a data processed by the CPU 101, and so on. The memory device 103 is a non-volatile storage device. The memory device 103 may be a ROM (Read Only Memory), a solid state drive (SSD) such as a flash memory, or a hard disk driven by a hard disk drive. When the CPU 101 executes a temperature measurement program, the indicator 21, the temperature measurer 22, the corrector 23 and so on are established in the controller 20. The indicator 21, the temperature measurer 22 and the corrector 23 may be dedicated circuits or the like.

The laser 11 is a light source such as a semiconductor laser. The laser 11 emits a laser light of a predetermined wavelength range in accordance with an instruction of the indicator 21. In the embodiment, the laser 11 emits an optical pulse (laser pulse) at a predetermined time interval. The beam splitter 12 inputs an optical pulse emitted by the laser 11 into the optical switch 13. The optical switch 13 switches destinations (channels) of the optical pulse. In a double end method described later, the optical switch 13 alternately inputs an optical pulse into a first end and into a second end of the optical fiber 30 at a predetermined cycle in accordance with an instruction of the indicator 21. In a single end method described later, the optical switch 13 inputs an optical pulse into one of the first end and the second end of the optical fiber 30 in accordance with an instruction of the indicator 21. The optical fiber 30 is arranged along a predetermined path of a temperature measurement object. In the embodiment, a length of the optical fiber 30 is L meter (m). A position of the first end is 0 meter (m). A position of the second end is L meter (m).

The optical pulse input into the optical fiber 30 propagates in the optical fiber 30. The optical pulse propagates in the optical fiber 30, generates a forward-scattering light progressing toward a propagation direction and a back-scattering light progressing toward a return direction (returning light), gradually attenuates, and propagates in the optical fiber 30. The back-scattering light passes through the optical switch 13 and is input into the beam splitter 12 again. The back-scattering light input into the beam splitter 12 is emitted toward the filter 14. The filter 14 is a WDM coupler or the like, and extracts a long wavelength component (Stokes component described later) and a short wavelength component (anti-Stokes component) from the back-scattering light. The detectors 15a and 15b are a photo diode. The detector 15a converts light intensity of the short wavelength component of the back-scattering light into an electrical signal and transmits the electrical signal to the temperature measurer 22 and the corrector 23. The detector 15b converts light intensity of the long wavelength component of the back-scattering light into an electrical signal, and transmits the electrical signal into the temperature measurer 22 and the corrector 23. The temperature measurer 22 uses the Stokes component and the anti-Stokes component and measures temperature distribution information of an extension direction of the optical fiber 30. The corrector 23 corrects the temperature distribution information obtained by the temperature measurer 22.

Figure 2:
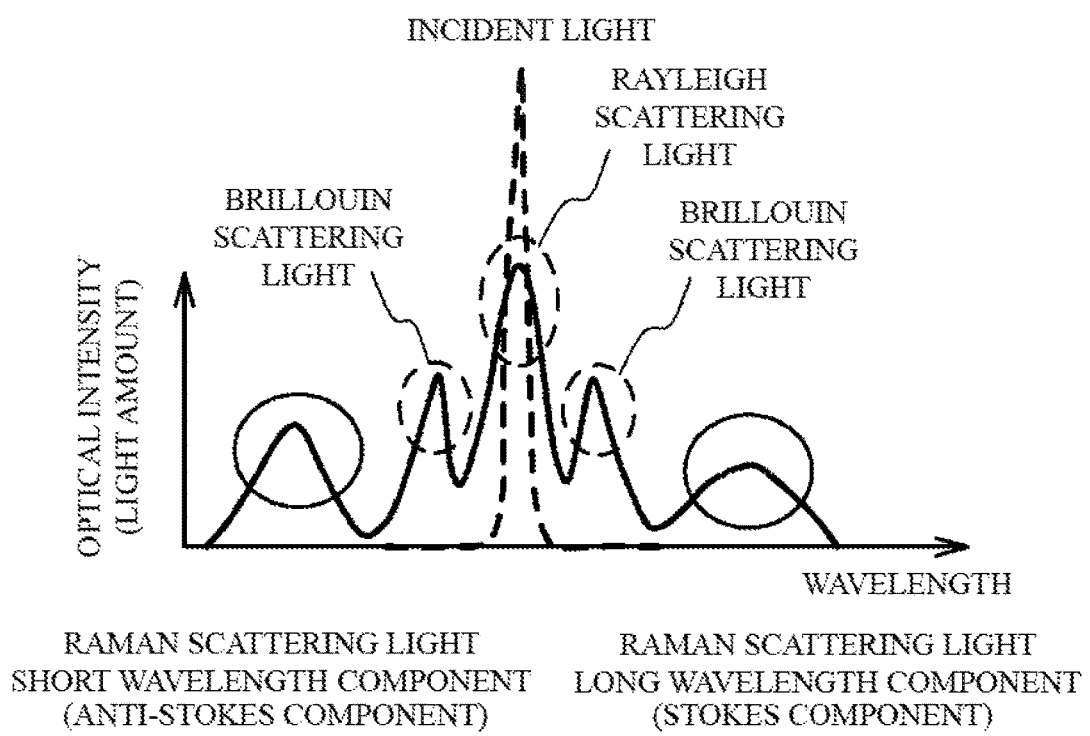
FIG. 2 illustrates components of a back-scattering light.

FIG. 2 illustrates components of the back-scattering light. As illustrated in FIG. 2, the back-scattering light is roughly classified into three types. The three types of light are a Rayleigh scattering light used for an OTDR (Optical Time Domain Reflectometer), a Brillouin scattering light used for distortion measurement, and a Raman scattering light used for temperature measurement, in descending order according to optical intensity and in short-distance order with respect to the input optical wavelength. The Rama scattering light is generated by interference between a lattice oscillation and a light changing according to temperature in the optical fiber 30. A short wavelength component called anti-Stokes component is generated by intensified interference. A long wavelength component called Stokes component is generated by weakened interference.

Figure 3A:
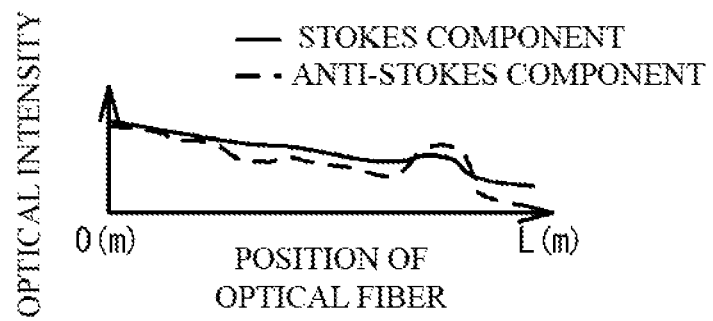
FIG. 3A illustrates a relationship between an elapse time after optical pulse emission by a laser and optical intensities of a Stokes component and an anti-Stokes component.

FIG. 3A illustrates a relationship between an elapse time after optical pulse emission by the laser 11 and optical intensities of the Stokes component (long wavelength component) and the anti-Stokes component (short wavelength component). The elapse time corresponds to a propagation distance of the optical fiber 30 (a position in the optical fiber 30). As illustrated in FIG. 3A, the optical intensities of the Stokes component and the anti-Stokes component are gradually reduced as time passes. This is because the optical pulse propagates in the optical fiber 30 and is gradually reduced with generation of the forward scattering light and the back-scattering light.

As illustrated in FIG. 3A, the optical intensity of the anti-Stokes component is stronger than that of the Stokes component at a position where a temperature of the optical fiber is relatively higher. The optical intensity of the anti-Stokes component is weaker than that of the Stokes component at a position where the temperature is relatively lower. It is therefore possible to detect a temperature of each position of the optical fiber 30 when the detectors 15a and 15b detect the both components and a difference of characteristic of the both components is used. A region of local maximum in FIG. 3A is a part of the optical fiber 30 that is intentionally heated by a drier or the like in FIG. 1A. A region of local minimum is a part of the optical fiber 30 that is intentionally cooled by cold water or the like in FIG. 1A.

Figure 3B:
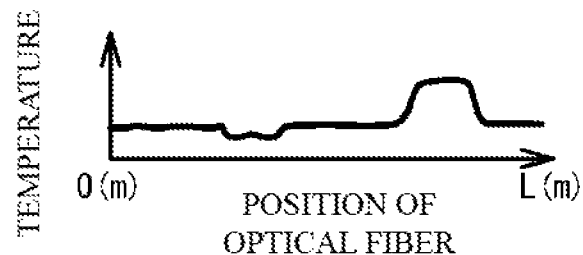
FIG. 3B illustrates a temperature calculated with use of a detection result of FIG. 3A.

In the embodiment, the temperature measurer 22 measures a temperature with respect to each passage time from the Stokes component and the anti-Stokes component. Thus, it is possible to measure a temperature of each position of the optical fiber 30. That is, it is possible to measure a temperature distribution in an extension direction of the optical fiber 30. It is possible measure the temperature with high accuracy even if the optical intensities of the both components are reduced in accordance with the distance, because the difference of the characteristics of the both components is used. FIG. 3B illustrates a temperature calculated with use of a detection result of FIG. 3A. A horizontal axis of FIG. 3B is a position of the optical fiber 30 calculated based on the passage time. As illustrated in FIG. 3B, when the Stokes component and the anti-Stokes component are detected, the temperature of each position of the optical fiber 30 can be measured.

Figure 4A:
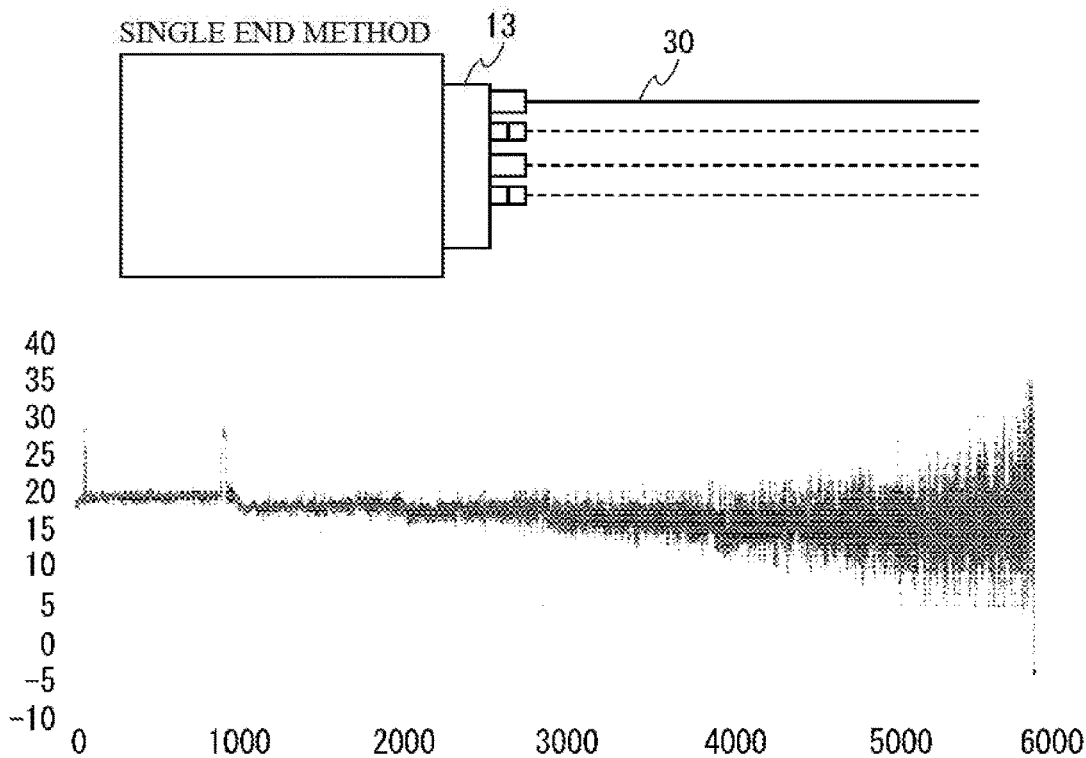
FIG. 4A illustrates a single end method.

A method in which an incident position of the optical fiber 30 from the optical switch 13 is fixed to the first end or the second end as illustrated in FIG. 4A is called one-end method or a single end method (hereinafter referred to as a single end method). In the single end method, it is not necessary to switch the incident position. Therefore, there is a merit of simplifying the measurement process of a temperature. On the other hand, noise becomes larger as a position gets away from the incident position.

Figure 4B:
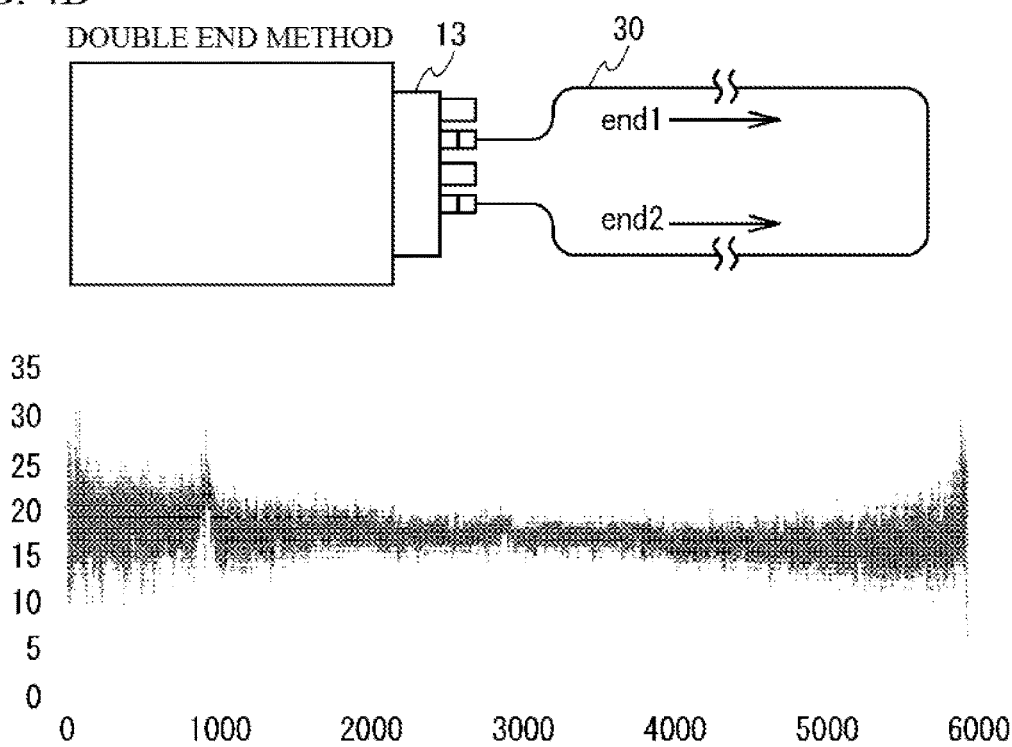
FIG. 4B illustrates a double end method.

A method in which an incident position is switched between the first end and the second end at a predetermined interval as illustrated in FIG. 4B is called a loop type measurement, a double end measurement or a dual end measurement (hereinafter referred to as a double end method). In the double end method, before and after the switching, it is possible to measure the temperature by averaging the anti-Stokes light amount and the Stokes light amount with respect to the position of the optical fiber 30. In the method, it is necessary to control the switching of the incident position. However, there is a merit of reducing the noise at the end of the optical fiber 30. For example, a temperature resolution performance of the double end method is four times as high as that of the single end method.

A transmission loss occurs when a path is excessively bent. Optical intensity is sharply reduced at the position where the path is bent. In this case, the optical intensity is sharply reduced. The ratio between the Stokes component and the anti-Stokes component is changed. And, the temperature measurement accuracy is degraded. However, in the double end method, the sharp changing before and after the bent loss is canceled when averaging the measured temperature. That is, the changing in a longitudinal direction of the loss can be canceled.

Figure 5:
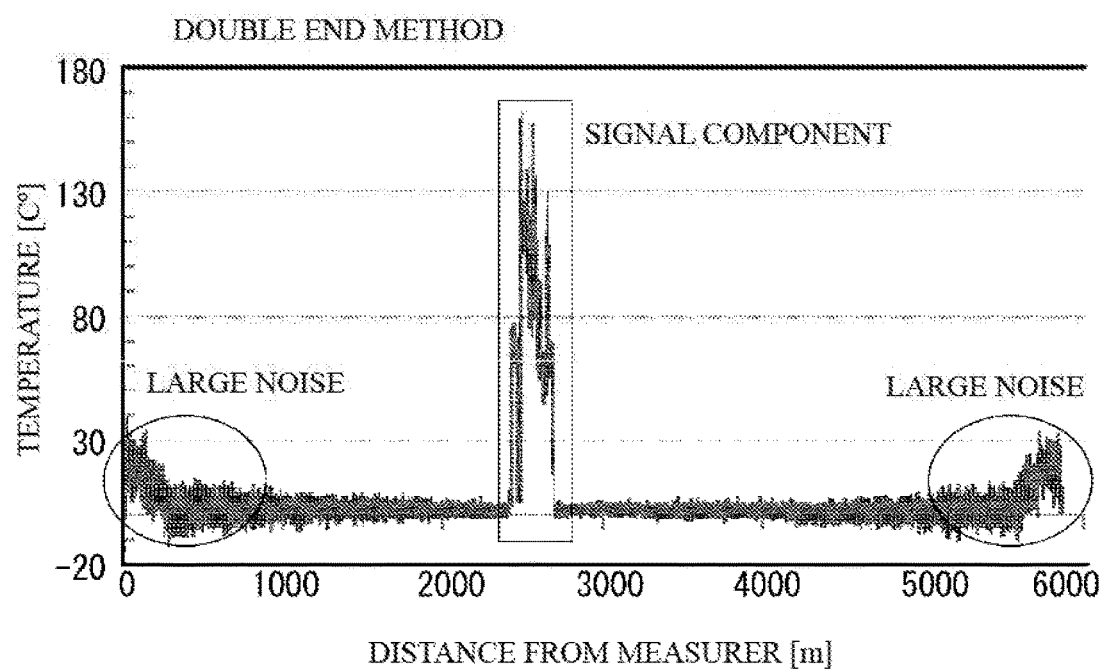
FIG. 5 illustrates noise and a signal component of a double end method.

However, in the single end method and the double end method, noise may occur. Noise and power spectrum of a signal component differ according to the difference of the methods. The signal component is a component of a temperature distribution in an extension direction of the optical fiber 30. The noise and the power spectrum of the signal component also differ according to the difference of the measurement positions. That is, it is difficult to estimate the temperature distribution or overlapping of the noise. FIG. 5 illustrates noise and a signal component of the double end method. However, the noise and the power spectrum of the signal component differ according to the difference of the methods and the difference of the measurement positions.

Figure 6:
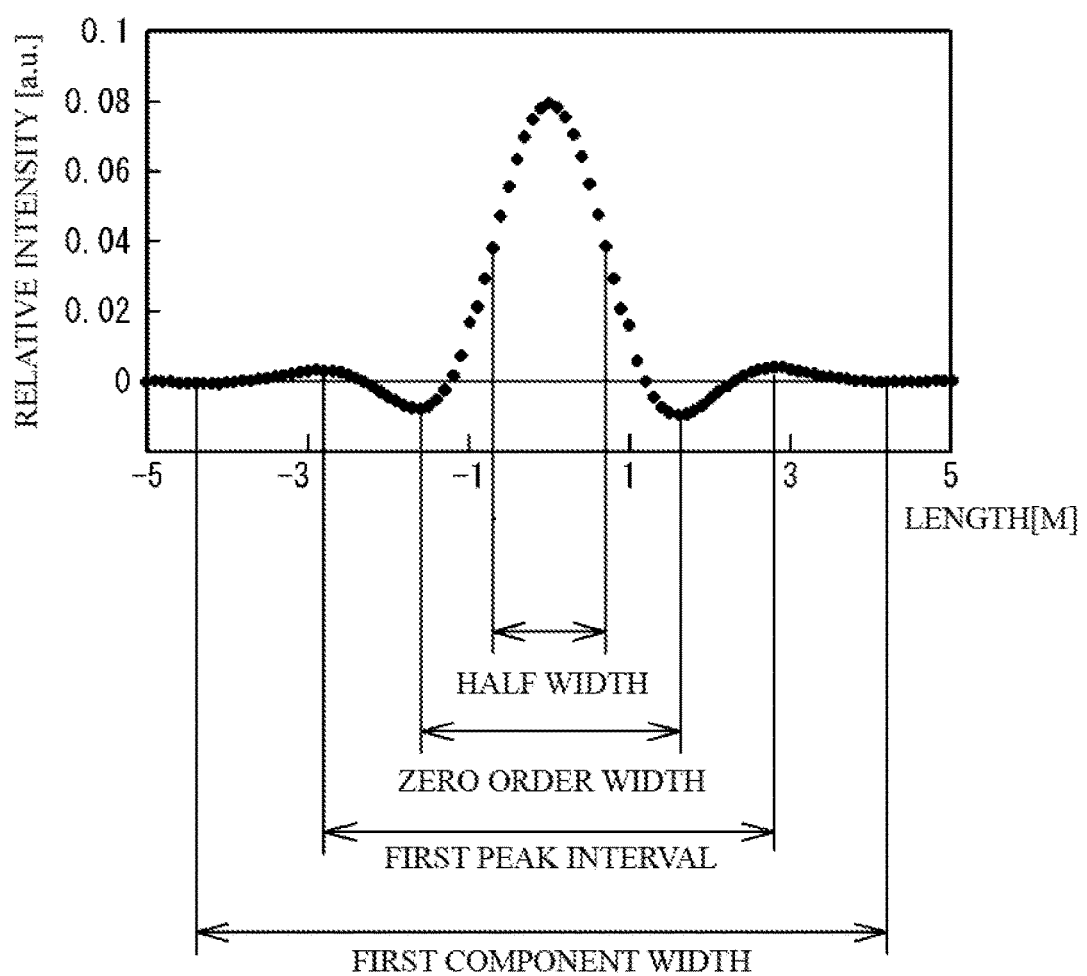
FIG. 6 illustrates a typical impulse response.

The temperature in a case where a higher temperature part is provided in a constant temperature region may be considered as equivalent to a single square wave to which an impulse response is convolved. Thus, the impulse response of the system is determined. FIG. 6 illustrates a typical example of the impulse response. In the temperature measurement of an optical fiber with use of a back Raman scattering light, as illustrated in FIG. 6, the impulse response may be considered as a wave in which a window function is applied to a sinc function so that a distance away from a center is smoothly attenuated. However, the impulse response differs according to the measurement environment.

And so, in the embodiment, an adequate filter according to laying environment of the optical fiber and a measurement condition is made by obtaining noise information. And, the noise is reduced by applying the filter to measurement temperature information.

Figure 7:
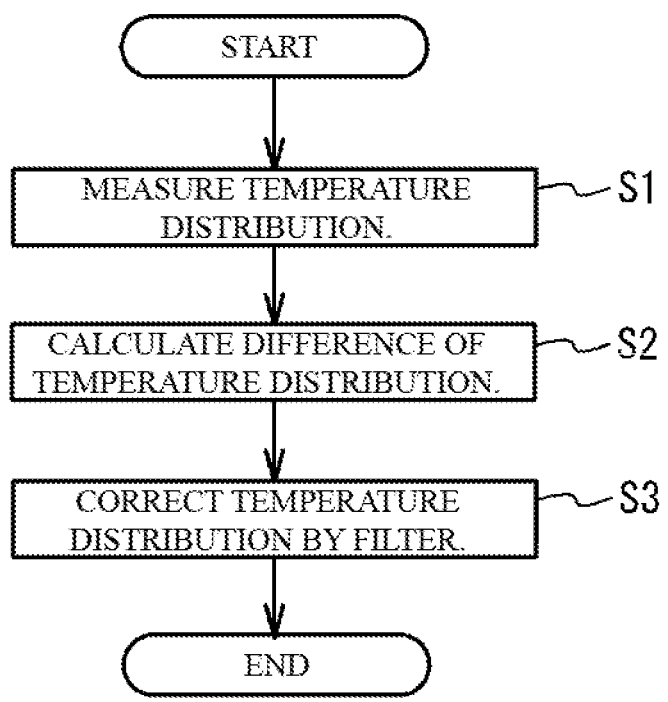
FIG. 7 illustrates a flowchart of processes performed by a controller.

FIG. 7 illustrates a flowchart of processes performed by the controller 20. As illustrated in FIG. 7, the temperature measurer 22 measures a temperature distribution of the optical fiber 30 in an extension direction thereof based on a Raman scattering light from the optical fiber 30 (Step S1). In this case, the temperature measurer 22 measures information relating to the temperature distribution of two different regions of a single optical fiber 30 that are positioned in a specific region of a path on which the optical fiber 30 is arranged.

Figure 8A:
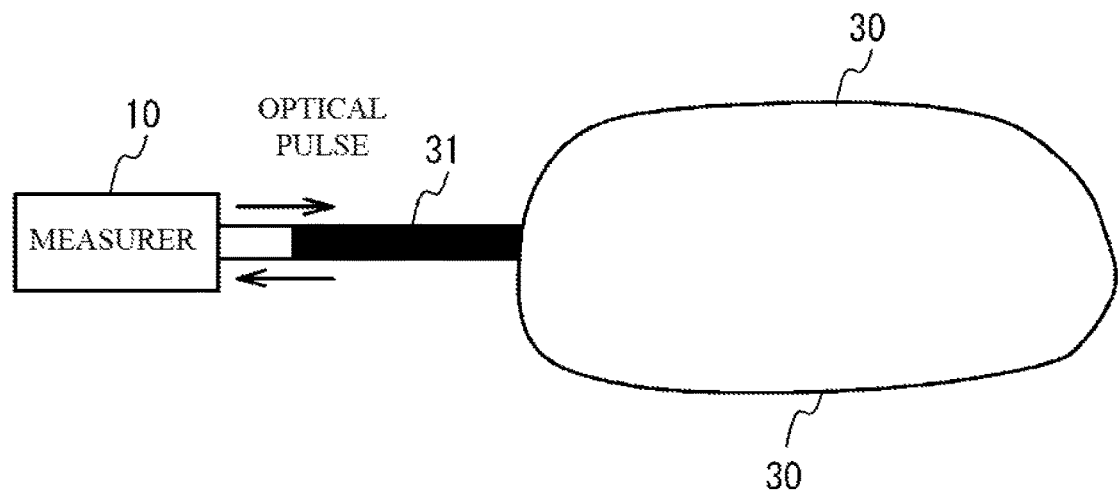
FIG. 8A illustrates a termination cable.

For example, a termination cable may be used. The termination cable has a multi-core optical fiber region 31 in which both end parts of the optical fiber 30 are bundled and protected by a sheath. FIG. 8A illustrates the termination cable. As illustrated in FIG. 8A, in the multi-core optical fiber region 31, a first end portion on the light incident side (around 0 m) and a second end portion on the light emission side (around L m) are bundled and are protected by the sheath. When the optical fiber 30 having the structure is used, it is possible to measure a common temperature distribution in two different regions of the optical fiber 30, in the multi-core optical fiber region 31.

Figure 8B:
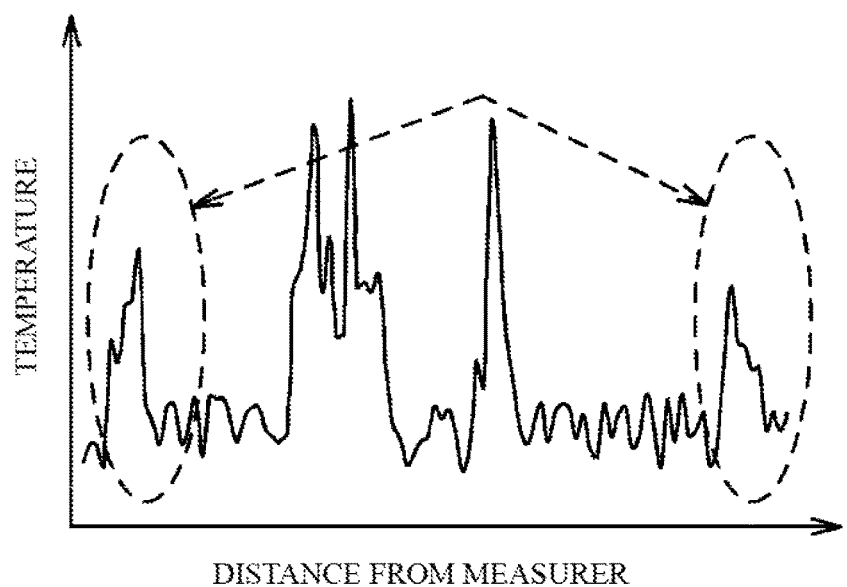
FIG. 8B illustrates a temperature distribution.

FIG. 8B illustrates a relationship between a distance of the optical fiber 30 from the measurement device 10 and a temperature measured based on a Raman scattering light. In the multi-core optical fiber region 31, the common temperature distribution is measured. In the multi-core optical fiber region 31, the propagation direction of light is opposite to each other. Therefore, temperature distributions symmetrical to the distance from the measurement device 10 are measured. When influence of noise does not occur, a waveform of a temperature in a region (a first region) on the light incident side of the multi-core optical fiber region 31 is symmetrical to a waveform of a temperature in a region (a second region) on the light emission side of the multi-core optical fiber region 31, in FIG. 8B. However, the distance from the measurement device 10 to the second region is large and noise is large. Therefore, there is a difference of the waveforms of the measured temperature distributions between the first region and the second region, as illustrated in FIG. 8B.

And so, the corrector 23 calculates a difference of the two temperature distributions measured in the multi-core optical fiber region 31 (Step S2). In Step S2, the difference of the measured temperatures at each position of the multi-core optical fiber region 31 is calculated. In the multi-core optical fiber region 31, the common temperature distribution is measured. Therefore, signal components relating to the temperature are canceled by the difference. Accordingly, a noise component is left in the difference.

Figure 9A:
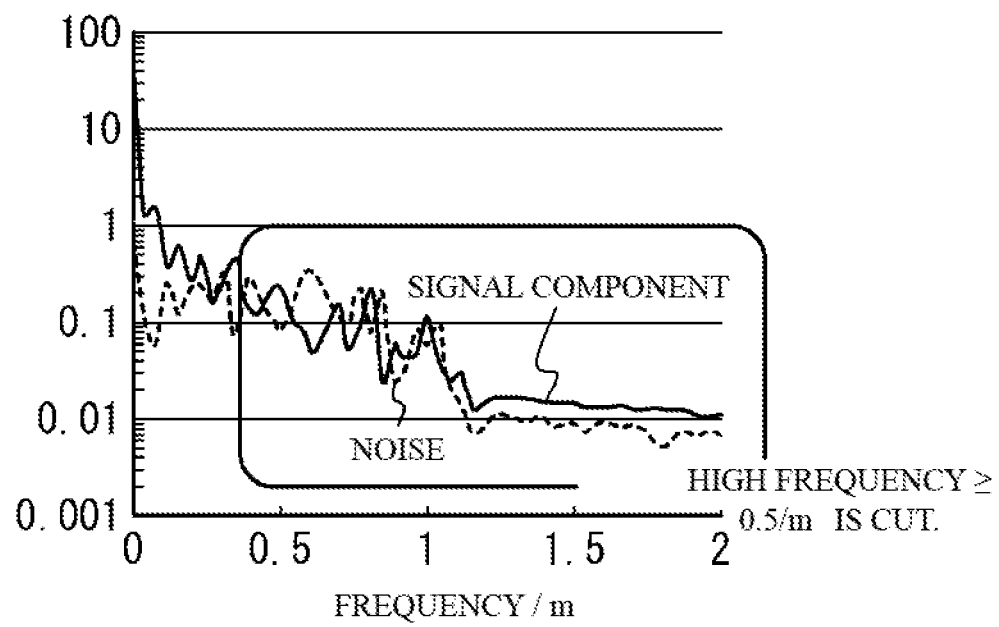
FIG. 9A illustrates power spectrum of noise.

Next, the corrector 23 makes a filter from the obtained noise component and the measured temperature distribution, and corrects the temperature distribution by applying the filter to the measured temperature distribution (Step S3). Thus, the influence of the noise is suppressed. In the example of FIG. 8B, the noise of the second region is larger than that of the first region in the multi-core optical fiber region 31. And so, the temperature waveform of the first region that is mirror-reversed is subtracted from the temperature waveform of the second region. Thus, the signal component relating to the temperature is subtracted. And a waveform of the noise is obtained. When Fourier transform is applied to the noise waveform, power spectrum of the noise illustrated in FIG. 9A is obtained.

The waveform of the noise is obtained based on the relationship between the distance and the waveform. Therefore, the power spectrum of the noise is expressed so that a horizontal axis is "frequency/m". In FIG. 9A, the signal component relating to the temperature is overlapped with the power spectrum of the noise. The method of obtaining the signal component is not specifically limited. For example, the signal component may be obtained by applying Fourier transform to the measured temperature of the first region. As illustrated in FIG. 9A, the difference between the signal component and the noise becomes smaller on the high frequency side. And so, when a low pass filter for cutting the high frequency side is made, it is possible to suppress the influence on the signal component and remove the noise component.

Figure 9B:
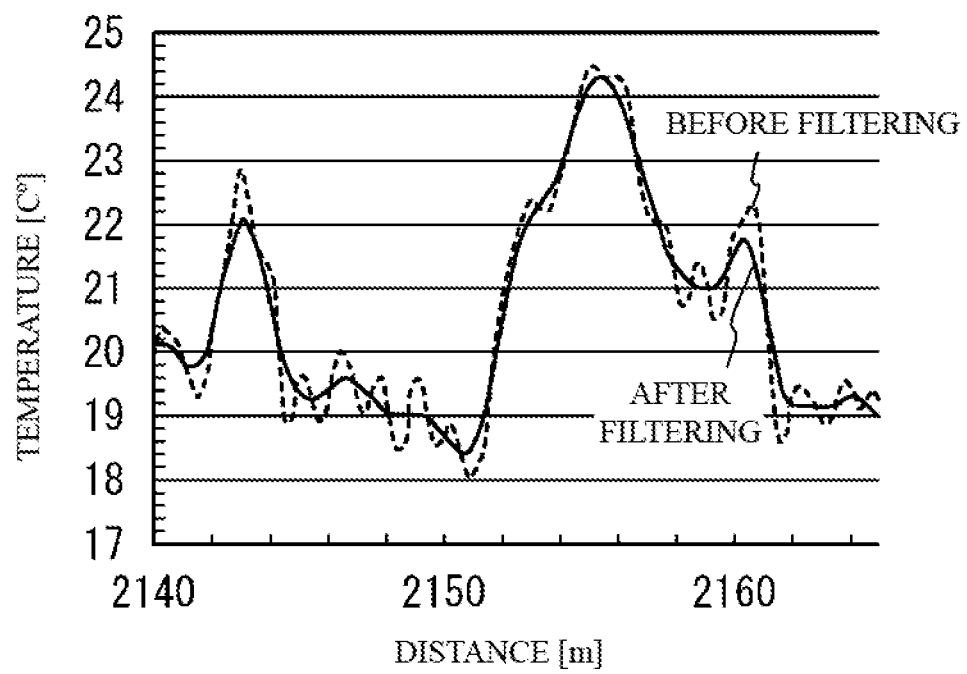
FIG. 9B illustrates a measured temperature in a case where a high frequency component is cut.

FIG. 9B illustrates a measured temperature in a case where a high frequency component that is equal to or more than 0.5/m is cut. In FIG. 9B, a broken line indicates the measured temperature before cutting. A solid line indicates the measured temperature after cutting. As illustrated in FIG. 9B, the waveform after cutting is smoother than that before cutting. This is because the influence of the noise is suppressed by cutting the high frequency component.

Figure 10A:
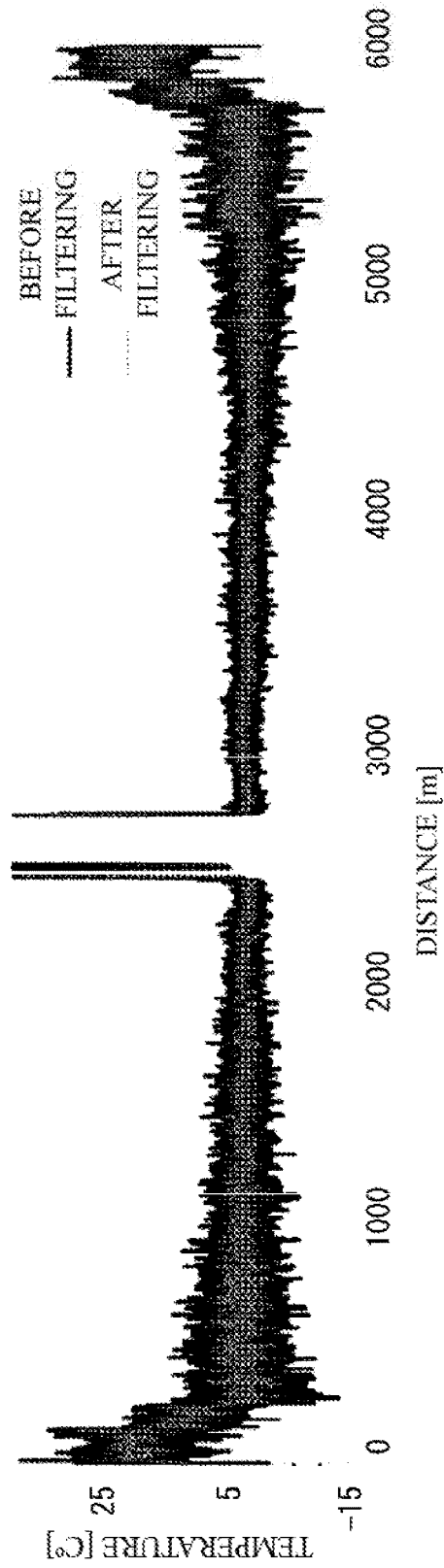
FIG. 10A illustrates a measured temperature in a case where a high frequency component is cut.

FIG. 10A illustrates the measured temperature in a case where a high frequency component is cut by the above-mentioned low-pass filter. The example of FIG. 10A indicates an average between a measured temperature that is filtered in a case where a light is input into the first end and a measured temperature that is filtered in a case where a light is input into the second end in the double end method. As illustrated in FIG. 10A, variation after filtering is suppressed more than variation before filtering. And, influence of noise is suppressed.

In the example of FIG. 10A, a temperature from 2400 m to 2700 m is intentionally raised. That is, a signal relating to a high temperature is detected from 2400 m to 2700 m. FIG.

Figure 10B:
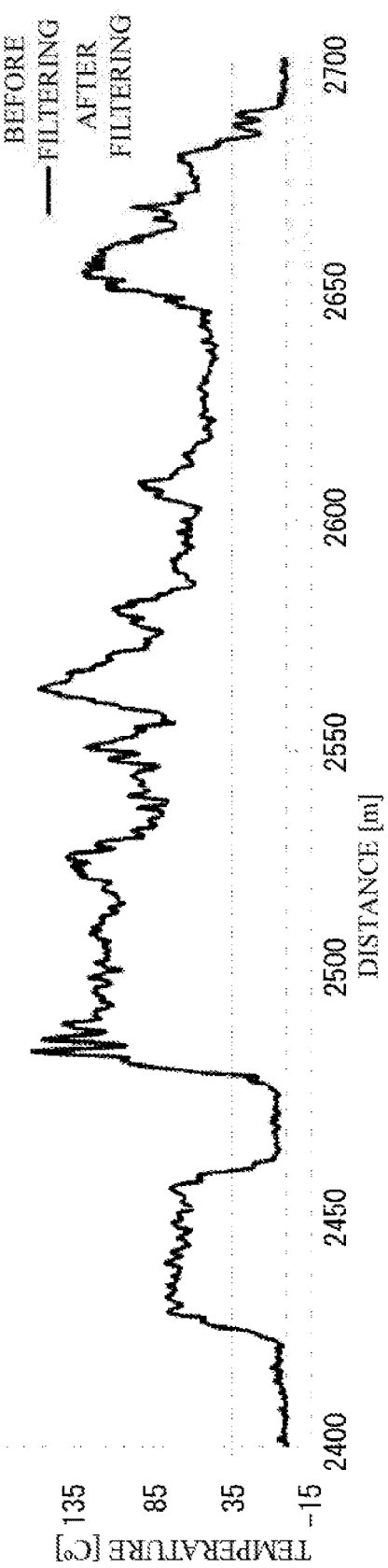
FIG. 10B illustrates an enlarged view of a measured temperature from 2400 m to 2700 m.

10B illustrates an enlarged view of the measured temperature from 2400 m to 2700 m. As illustrated in FIG. 10B, the difference between before filtering and after filtering is not large. This means that the influence of noise is suppressed by filtering, and the influence on the signal component is suppressed. In this manner, it is possible to suppress the influence on the signal component and suppress the influence of noise by the filtering for cutting the high frequency component.

FIG. 11 illustrates a standard deviation before the filtering and after the filtering of each position of the optical fiber 30 with respect to the result of FIG. 10A. As illustrated in FIG. 11, before the filtering, the standard deviation of each position is large. However, after the filtering, the standard deviation of each position is reduced. This is because the influence of noise is suppressed, and thereby the variation of the measured temperature is suppressed. It is preferable that the filtering is performed several times. For example, it is possible to suppress the influence of noise when a filter is made with respect to the measured temperature after the filtering and the filter is applied to the measured temperature after the filtering.

In the above-mentioned example, the power spectrum of noise is obtained from the difference between the measured temperature of the first region and the measured temperature of the second region of the multi-core optical fiber region 31. However, the structure is not limited. For example, an adaptive filter may be made from the difference between the measured temperature of the second region in which noise is large and the measured temperature of the first region in which noise is small. A description will be given of a making process of the adaptive filter.

Figure 12A:
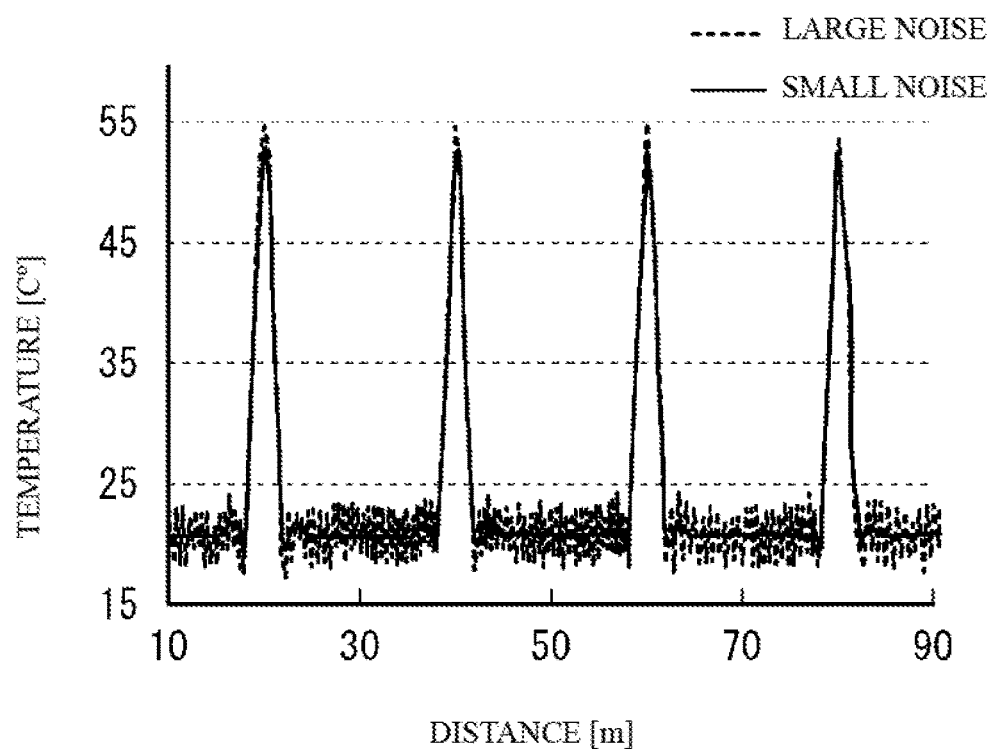
FIG. 12A illustrates a measured temperature that is intentionally achieved.

In the multi-core optical fiber region 31, a temperature distribution illustrated in FIG. 12A is intentionally made. That is, a temperature distribution is made so that temperature peaks occurs at a predetermined interval. In FIG. 12A, "small noise" indicates a measured temperature of the first region. "large noise" indicates a measured temperature of the second region. That is, a horizontal axis of FIG. 12A indicates a distance from the measurement device 10 in the first region. And, FIG. 12A also indicates a corresponding distance in the second region.

A temperature at a position n(m) of the optical fiber 30 in the first region in which noise is small is d[n]. A temperature at the position in which noise is large is x[n]. A temperature of a position in the second region corresponding to the position n(m) may be used as x[n]. A filter coefficient of n-k is hk. "k" is −M to +M. [M] is ½ of an application range of the adaptive filter, and is, for example, 1 m or the like. A temperature at the position n(m) after the filtering is y[n]. y[n] may be expressed by the following formula (1).

$$y[n] = \Sigma_{k=-M}^{M} h_k x[n-k] \quad \text{[Formula 1]}$$

An error after the filtering is ε[n]. ε[n] may be expressed by d[n]−y[n]. In this case, a square mean error may be expressed by the following formula (2). E{ } indicates a expectation value operation. $P_d$ is a constant. P[k] is a mutual correlation function between d[n] and x[n]. p[k] is expressed by p[k]=E{d[n]·x[n−k]}. r[m] indicates a self correlation function of x[n] and is expressed by r[m]=E{x[n]·x[n+m]}.

$$E\{\varepsilon^2[n]\} = E\{d^2[n]\} - 2E\{d[n]\cdot y[n]\} + E\{y^2[n]\} = P_d - 2\Sigma_{k=-M}^{M} h_k p[k] + \Sigma_{k=-M}^{M} h_k h_m r[m-k] \quad \text{[Formula 2]}$$

Figure 12B:
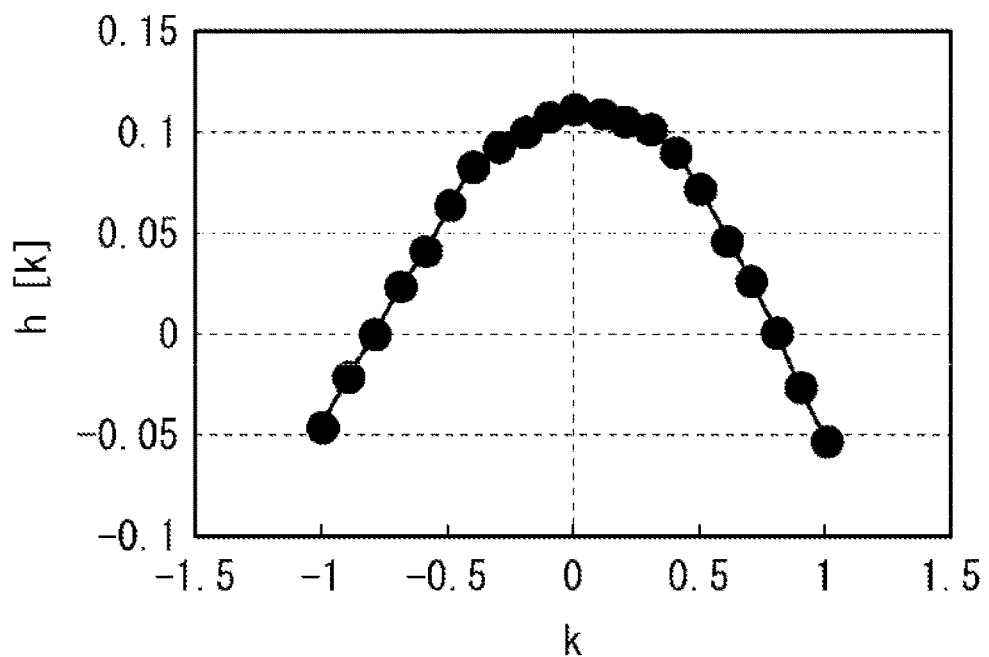
FIG. 12B illustrates a calculation result of a filter coefficient.

The coefficient of $h_0^2 h_1^2 h_2^2 \ldots$ is r[0]. The square mean error is minimum when the following formula (3) is satisfied, because r[0] is larger than 0. That is, an optimal filter coefficient $h_k$ is obtained. FIG. 12B illustrates a calculation result of the filter coefficient $h_k$. When the adaptive filter is applied to each position at a predetermined interval of the optical fiber 30, the influence of noise of the measured temperature may be suppressed.

$$\frac{\partial}{\partial h_k} E\{\varepsilon^2[n]\} = -2p[k] + 2\sum_{m=-M}^{M} h_m r[m-k] = 0 \quad \text{[Formula 3]}$$

Figure 13A:
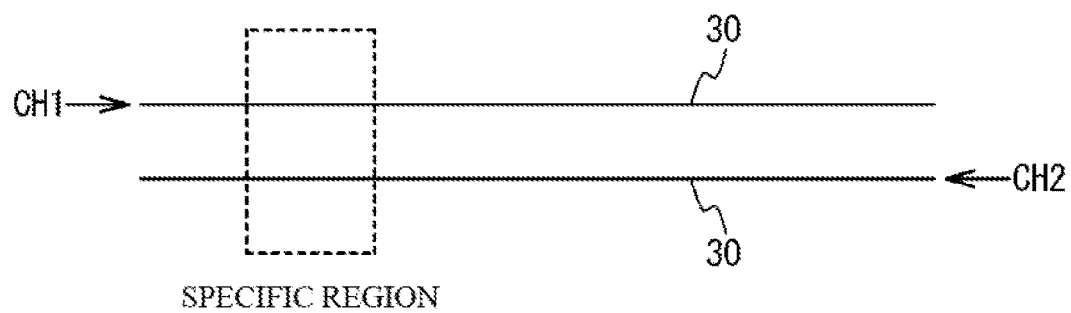
FIG. 13A illustrates another example of an optical fiber.

In the above-mentioned example, the termination cable is used as a measurer for measuring a common temperature distribution. However, the structure is not limited. For example, as illustrated in FIG. 13A, two optical fibers 30 are arranged along with each other. A light is input into a first end of the one of the two optical fibers 30. A light is input into a second end of the other of the two optical fibers 30. A channel in which the light is input into the first end is a channel 1. A channel in which the light is input into the second end is a channel 2. The optical switch 13 can switch the channel 1 and the channel 2.

When any region of a path in which the two optical fibers 30 are arranged is selected as a specific region, a common temperature distribution is obtained in the specific region. When the specific region is intentionally heated so that the signal component is distinguished from the noise, the common temperature distribution may be apparent. It is preferable that the specific region is on any end side in order to reduce the noise in the specific region of one of the optical fibers and enlarge the noise of the specific region of the other.

Figure 13B:
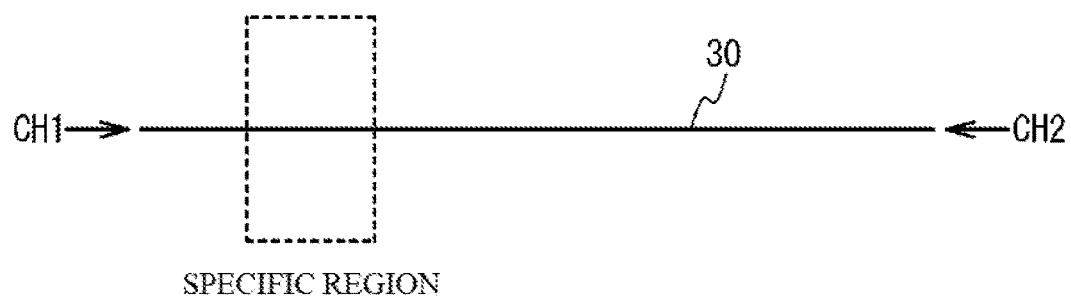
FIG. 13B illustrates another example of an optical fiber.

As illustrated in FIG. 13B, a channel in which a light is input into a first end of a single optical fiber 30 is a channel 1. A channel in which a light is input into a second end of the single optical fiber 30 is a channel 2. The optical switch 13 can switch the channel 1 and the channel 2. When any region of a path in which the optical fiber 30 is arranged is selected as a specific region, a common temperature distribution is obtained in the specific region. When the specific region is intentionally heated so that the signal component is distinguished from the noise, the common temperature distribution may be apparent. It is preferable that the specific region is shifted from the center of the optical fiber 30 to any end side thereof in order to reduce the noise of the specific region of one of the channels 1 and 2, and enlarge the noise of the specific region of the other channel.

Figure 14:
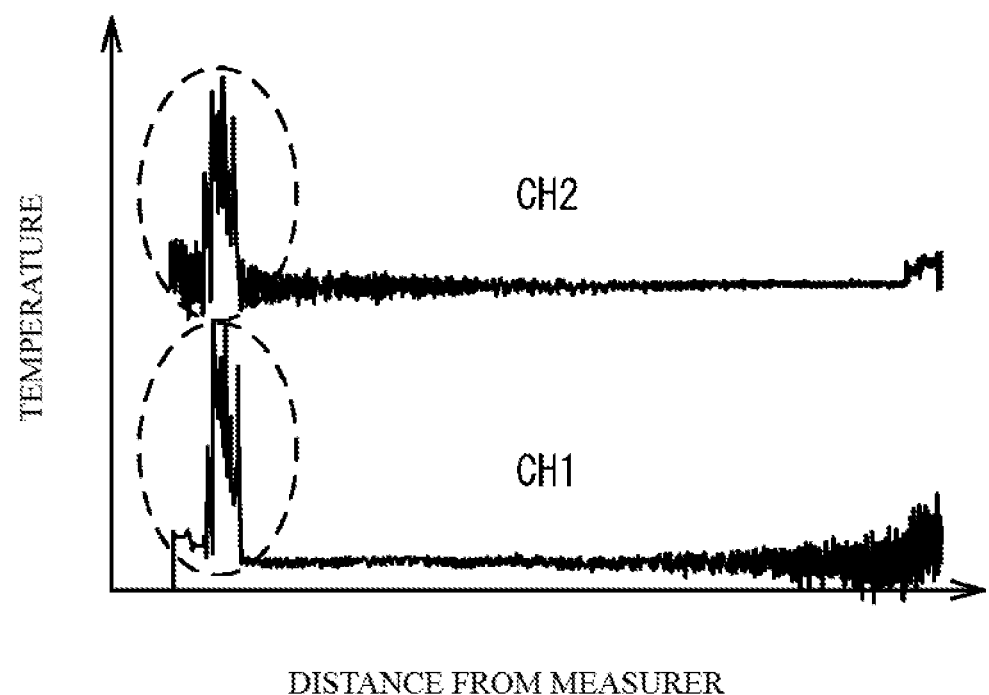
FIG. 14 illustrates a measured temperature of a channel 1.

FIG. 14 illustrates a measured temperature of the channel 1. As illustrated in FIG. 14, the noise becomes larger as a distance from the measurement device 10 gets larger. The noise becomes smaller in a region that is close to the measurement device 10. FIG. 14 also illustrates a measured temperature of the channel 2. In the channel 2, the distance from the measurement device 10 is reversed. When a higher temperature region is provided in a region that is close to the measurement device 10 in the channel 1, the higher temperature region occurs in a region that is farer from the measurement device 10 in the channel 2. It is possible to use these higher temperature regions as a specific region in which a common temperature distribution is obtained. That is, it is possible to obtain the measured temperature, in which noise is small, from the higher temperature region of the channel 1. It is possible to obtain the measured temperature, in which noise is large, from the higher temperature region of the channel 2. When the optical switch 13 switches the channels, a time lag occurs in the temperature measurement.

However, the temperature in the constant temperature region is not sharply changed. Therefore, a making accuracy of the filter is not influenced.

In the above-mentioned embodiment, the optical fiber 30 acts as an optical fiber that is arranged along a predetermined path. The laser 11 acts as a light source configured to input a light into the optical fiber. The temperature measurer 22 acts as a measurer configured to measure temperature distribution information in an extension direction of the optical fiber based on a back-scattering light from the optical fiber. The corrector 23 acts as a corrector configured to make a filter for reducing a noise component of temperature distribution information measured by the measurer based on a difference of temperature distribution information between two different regions of the optical fiber in which a common temperature distribution is obtained, and correct the temperature distribution information by applying the filter to the temperature distribution information. And the corrector 23 acts as a corrector configured to make a filter for reducing a noise component of temperature distribution information measured by the measurer based on a difference between temperature distribution information obtained in a case where the light source inputs a light into a first end of the optical fiber and temperature distribution information obtained in a case where the light source inputs a light into a second end of the optical fiber in a specific region of the optical fiber, and correct the temperature distribution information by applying the filter to the temperature distribution information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

A temperature measurement method may include: inputting a light into an optical fiber that is arranged along a predetermined path; measuring temperature distribution information in an extension direction of the optical fiber based on a back-scattering light from the optical fiber; making a filter for reducing a noise component of measured temperature distribution information based on a difference between temperature distribution information obtained in a case where the light source inputs a light into a first end of the optical fiber and temperature distribution information obtained in a case where the light source inputs a light into a second end of the optical fiber in a specific region of the optical fiber; and correcting the temperature distribution information by applying the filter to the temperature distribution information. The filter may be a low-pass filter that is made based on power spectrum obtained by the difference. The filter may be an adaptive filter obtained based on the difference.

A computer readable, non-transitory medium may store a program that causes a computer to execute a process, the process including: measuring temperature distribution information in an extension direction of an optical fiber that is arranged along a predetermined path based on a back-scattering light from the optical fiber, a light being input into the optical fiber from a light source; making a filter for reducing a noise component of measured temperature distribution information based on a difference of temperature distribution information between two different regions of the optical fiber in which a common temperature distribution is obtained; and correcting the temperature distribution information by applying the filter to the temperature distribution information.

A computer readable, non-transitory medium may store a program that causes a computer to execute a process, the process including: measuring temperature distribution information in an extension direction of an optical fiber that is arranged along a predetermined path based on a back-scattering light from the optical fiber, a light being input into the optical fiber from a light source; making a filter for reducing a noise component of measured temperature distribution information based on a difference between temperature distribution information obtained in a case where the light source inputs a light into a first end of the optical fiber and temperature distribution information obtained in a case where the light source inputs a light into a second end of the optical fiber in a specific region of the optical fiber; and correcting the temperature distribution information by applying the filter to the temperature distribution information.

What is claimed is:

1. A temperature measurement device comprising:
   an optical fiber that is arranged along a predetermined path;
   a light source configured to input a light into the optical fiber;
   a measurer configured to measure each temperature of each position in an extension direction of the optical fiber based on a back-scattering light from the optical fiber; and
   a corrector configured to make a filter for reducing a noise component of temperatures measured by the measurer based on each difference of a part of the temperatures measured by the measurer at each position corresponding to each other between two different regions of the optical fiber in which common temperatures are obtained, and correct the temperatures measured by the measurer by applying the filter to the temperatures measured by the measurer.

2. The temperature measurement device as claimed in claim 1, wherein the two different regions are two different regions of a single optical fiber positioned in a specific region of the path.

3. The temperature measurement device as claimed in claim 1, wherein the two different regions are regions of two optical fibers positioned in a specific region of the path.

4. The temperature measurement device as claimed in claim 1, wherein the filter is a low-pass filter that is made based on power spectrum obtained by the difference.

5. The temperature measurement device as claimed in claim 1, wherein the filter is an adaptive filter obtained based on the difference.

6. A temperature measurement device comprising:
   an optical fiber that is arranged along a predetermined path;
   a light source configured to input a light into the optical fiber;
   a measurer configured to measure each temperature of each position in an extension direction of the optical fiber based on a back-scattering light from the optical fiber; and
   a corrector configured to make a filter for reducing a noise component of temperatures measured by the measurer based on each difference of a part of the temperatures measured by the measurer at each position corresponding to each other in a specific region of the optical fiber between a case where the light source inputs a light into a first end of the optical fiber and a case where the light source inputs a light into a second end of the optical fiber, and correct the temperatures measured by the measurer by applying the filter to the temperatures measured by the measurer.

7. The temperature measurement device as claimed in claim 6, wherein the filter is a low-pass filter that is made based on power spectrum obtained by the difference.

8. The temperature measurement device as claimed in claim 6, wherein the filter is an adaptive filter obtained based on the difference.

9. A temperature measurement method comprising:
inputting a light into an optical fiber that is arranged along a predetermined path;
measuring each temperature of each position in an extension direction of the optical fiber based on a back-scattering light from the optical fiber;
making a filter for reducing a noise component of temperatures measured in the measuring based on each difference of a part of the temperatures measured in the measuring at each position corresponding to each other between two different regions of the optical fiber in which common temperatures are obtained; and
correcting the temperatures measured in the measuring by applying the filter to the temperatures measured in the measuring.

10. The method as claimed in claim 9, wherein the two different regions are two different regions of a single optical fiber positioned in a specific region of the path.

11. The method as claimed in claim 9, wherein the two different regions are regions of two optical fibers positioned in a specific region of the path.

12. The method as claimed in claim 9, wherein the filter is a low-pass filter that is made based on power spectrum obtained by the difference.

13. The method as claimed in claim 9, wherein the filter is an adaptive filter obtained based on the difference.

14. The temperature measurement device as claimed in claim 1, wherein the two different regions are two different regions of a single optical fiber positioned in a specific region of the path,
wherein the specific region is a termination cable in which both end parts of the single optical fiber are bundled, and
wherein the two different regions are the end parts.

15. The method as claimed in claim 9, wherein the two different regions are two different regions of a single optical fiber positioned in a specific region of the path,
wherein the specific region is a termination cable in which both end parts of the single optical fiber are bundled, and
wherein the two different regions are the end parts.

* * * * *